United States Patent [19]

Fukuhara

[11] 4,266,865
[45] May 12, 1981

[54] DIAPHRAGM CORRECTING MEANS OF AN OBJECTIVE LENS MOUNTED ON A SINGLE LENS REFLEX CAMERA OF THE TTL FULL APERTURE EXPOSURE MEASUREMENT TYPE

[75] Inventor: Toru Fukuhara, Isehara, Japan
[73] Assignee: Nippon Kogaku K.K., Tokyo, Japan
[21] Appl. No.: 55,557
[22] Filed: Jul. 9, 1979
[30] Foreign Application Priority Data
Jul. 26, 1978 [JP] Japan ................. 53-101796
[51] Int. Cl.³ .............................. G03B 7/20
[52] U.S. Cl. ................................. 354/46
[58] Field of Search ............ 354/40, 43, 46, 270, 354/271, 286

[56] References Cited
U.S. PATENT DOCUMENTS 3,427,946  2/1969  Broschke et al. ............ 354/46
3,683,765  8/1972  Iura ........................... 354/46

Primary Examiner—L. T. Hix
Assistant Examiner—Thomas H. Tarcza
Attorney, Agent, or Firm—Fitzpatrick, Cella, Harper & Scinto

[57] ABSTRACT

In an objective lens removably mountable with respect to a camera housing and having a diaphragm member forming an aperture and diaphragm driving means displaceable to stop down the diaphragm member in a range over which the area of the aperture is from maximum to minimum, the housing having a metering circuit for measuring the light transmitted through the lens when the aperture is maximum, diaphragm correcting means are provided on at least one of the diaphragm driving means and the diaphragm member to impart a correction of the stop down step number corresponding to the difference between a theoretical metering output calculated from the open F-value of the lens and the brightness of an object and the actual metering output of the metering circuit, to the relation between the variation in area of the aperture and the displacement of the diaphragm driving means.

8 Claims, 6 Drawing Figures

DIAPHRAGM CORRECTING MEANS OF AN OBJECTIVE LENS MOUNTED ON A SINGLE LENS REFLEX CAMERA OF THE TTL FULL APERTURE EXPOSURE MEASUREMENT TYPE

BACKGROUND OF THE INVENTION

1. Field of The Invention

This invention relates to diaphragm correcting means of an objective lens mounted on a single lens reflex camera of the TTL full aperture exposure measurement type. The expression—full aperture exposure measurement—refers to a system for measuring the light transmitted through the objective lens when the lens aperture is fully opened.

2. Description of the Prior Art

In a single lens reflex camera of the TTL full aperture exposure measurement type wherein, for example, shutter speed priority automatic exposure control is effected, the preset diaphragm ring of the lens is set to a position in which a minimum aperture may be obtained to enable the stop-down of the diaphragm from its maximum aperture to its minimum aperture. Then, it is required to stop down the diaphragm from its maximum aperture to a proper aperture value determined by a preset shutter speed, film sensitivity, brightness of an object, etc. The metering output of a metering circuit included in the automatic exposure control circuit of TTL full aperture exposure measurement type of such a single lens reflex camera is substantially proportional to the area of the aperture formed by the diaphragm, but in lenses having a small open F-value such as F/1.2 or F/1.4, the aforementioned proportional relationship tends to become imprecise in the vicinity of the maximum aperture to thereby reduce the metering output. As the reason therefore, mention may be made of a reduction in the quantity of marginal light of the lens, and the characteristic of the construction of the metering optical system; for example, the fact that the greater the maximum aperture of the objective lens, the more difficult it is for a condenser lens of the metering optical system to condense the marginal light of the lens. In the case of the TTL full aperture exposure measurement, such imprecision of the mentioned proportional relationship appears directly as an exposure error. To correct such exposure error attributable to the open F-value of the lens, German Patent No. 1,258,727 discloses a technique in which a correcting cam is operatively associated with the preset diaphragm ring of the lens and an exposure meter needle is corrected and displaced by a lever following the correcting cam. This technique is effective in the case of an aperture priority system in which the photographer presets the aperture value and determines the diaphragm aperture by an aperture ring interlock member, but is not effective in the case of a shutter speed priority system in which a lever on the camera housing side determines the area of the aperture opening through a diaphragm driving lever on the lens side.

SUMMARY OF THE INVENTION

I have conceived and contribute by the present invention, correcting means for an objective lens adapted to be mounted on a single lens reflex camera of the TTL full aperture exposure measurement type which permit one to effect the aforementioned correction on the lens side without affecting the error of the metering output.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein.

DESCRIPTION OF THE PREFERRED EMBODIMENTS

Figure 1:
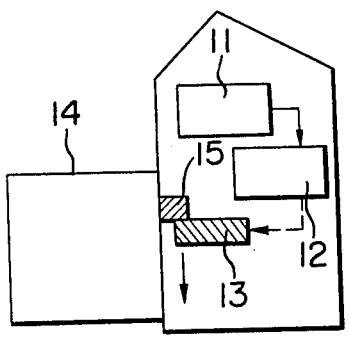
FIG. 1 shows a conceptual construction of a shutter priority type automatic exposure control camera.
Figure 2:
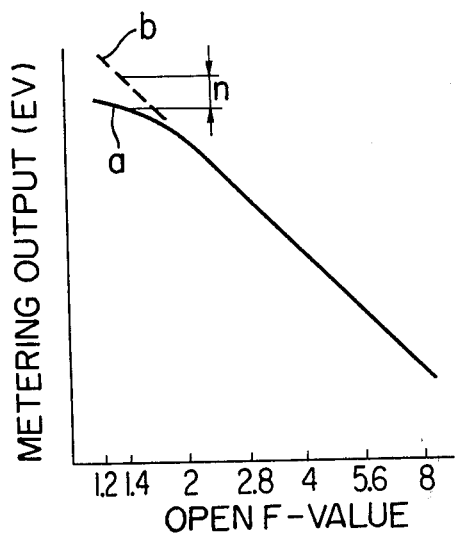
FIG. 2 illustrates the relationship between the metering output of a metering circuit and the open F-value of each interchangeable lens.

FIG. 1 shows a conceptual construction of a shutter speed priority type automatic exposure control camera wherein an automatic exposure control circuite 11, including a metering circuit, measures the light transmitted through a lens when a diaphragm forms a maximum aperture, and produces an output corresponding to an aperture value determined by a preset shutter speed and film sensitivity. An aperture control mechanism 12, in response to shutter release, displaces an interlock lever 13 from an initial position corresponding to said maximum aperture to a position corresponding to the output of the auotmatic exposure control circuit 11. A diaphragm driving lever 15 connected to the diaphragm of a lens 14 is displaced following the interlock lever 13, to stop down the aperture. The stop down is stopped at a position whereat the displacement of the interlock layer 13 is stopped. In this manner, the shutter speed priority automatic exposure control may be accomplished. Of course, the positional relationship between the interlock lever 13 and the diaphragm driving lever 15 is pre-adjusted so as to be convenient for the exposure control. FIG. 2 illustrates in a logarithmic graph the relationship between the metering output (EV display) of the metering circuit included in the automatic exposure control circuit 11 and the open F-value of each interchangeable lens when the object brightness and the set shutter speed and film sensitivity are constant. From the output characteristic curve $a$ of FIG. 2 showing the actual metering output, it is seen that the metering output is not proportional to the area of the aperture opening in lenses having great open apertures such as lenses of F/1.2 or F/1.4. For example, in a lens having an open F-value of F/1.4, it is seen from the theoretical output characteristic curve $b$ in which the area of the aperture opening at the open F-value of each interchangeable lens is proportional to the metering output and from the output characteristic curve $a$ showing the actual metering output that the actual metering output is lower than the theoretical metering output by $n$ steps (N<1).

Such reduction in output by $n$ steps is to be corrected. The correction will hereinafter be described in detail.

Figure 3:
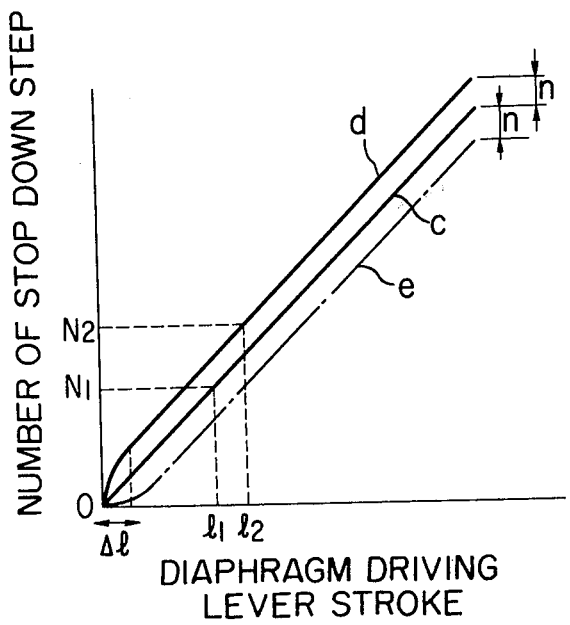
FIG. 3 illustrates the relationship between the displacement of a diaphragm driving lever and the number of stop down steps.

In FIG. 3, $c$ is the characteristic curve representing the stroke of the diaphragm driving lever and the number of steps of aperture value variation of a lens having an open F-value of F/2, namely, according to FIG. 2, a lens in which the theoretical metering output is coincident with the actual metering output. The curve $d$ is the characteristic curve representing the stroke of the diaphragm driving lever 15 and the number of steps of aperture value variation of a lens having an open F-value of F/1.4, namely, according to FIG. 2, a lens in which the actual metering output is reduced by $nEV$ from the theoretical metering output. As compared with $c$, $d$ is such that the number of steps of aperture value variation at the same stroke is stopped down by the aforementioned $n$ steps more in EV value from the vicinity of the open aperture to the minimum diaphragm aperture.

Now, assume that there is an object for which the aperture value F/4 is a proper exposure under a certain shutter speed. At this time, when full aperture exposure measurement is effected through a lens having an open F-value of F/2, the interlock lever 13 is positioned by the automatic exposure control circuit 11 and the aperture control mechanism 12 so that the diaphragm driving lever 15 can be displaced by a stroke $l_1$ to stop down the aperture by $N_1=2$ is stopped down by two steps from the open aperture. Thus, the aperture is stopped down by two steps from the open F-value F/2 along the characteristic curve $c$ and controlled to F/4. On the other hand, when full aperture exposure measurement is effected on the same object by the use of a lens having an open F-value of F/1.4, the automatic exposure control circuit 11 judges the number of stop down steps to be $(3-n)$ steps and controls the interlock lever 13 through the aperture control mechanism 12 so that the diaphragm driving lever 15 can be displaced by a stroke $l_2$ to stop down the aperture by $(3-n)$ steps from the open aperture. However, since the stroke of the diaphragm driving lever of the lens having an open F-value of F/1.4 is set as shown by the characteristic curve $d$ of FIG. 3, the actual number of the stop down steps is $N_2=(3-n)+m=3$ and after all, the aperture is stopped down by three steps from the open F-value of F/1.4 and controlled to F/4. Thus, proper exposure is obtained.

If the above-described correction is also made on other interchangeable lenses having great open apertures such as F/1.2, proper exposure control may be secured even for these interchangeable lenses. The stroke characteristic of FIG. 3 need not always be linear. Also, if the stroke characteristic of a lens having an open F-value of F/2 is such as indicated by $e$, the stroke characteristic of a lens of F/1.4 may of course be such as indicated by $c$. That is, design should only be made such that the difference in the number of stop down steps is $n$ for the same stroke.

As shown in FIG. 3, the difference in the number of stop down steps between the characteristic curve $d$ and the characteristic curve $c$ is small between the stroke O and $\Delta 1$ and the difference in the number of stop down steps approaches $n$ from 0 as the stroke becomes $\Delta 1$ from 0. This is a measure taken because the aperture of each lens must be fully open or maximum in the position in which the aperture lever stroke is 0. Even if so constructed, the exposure error of the lens having the characteristic curve $d$ can be suppressed to $\frac{1}{2}$ to $\frac{1}{3}$ step in the vicinity of the open or maximum aperture and so, there is no practical problem.

Figure 4:
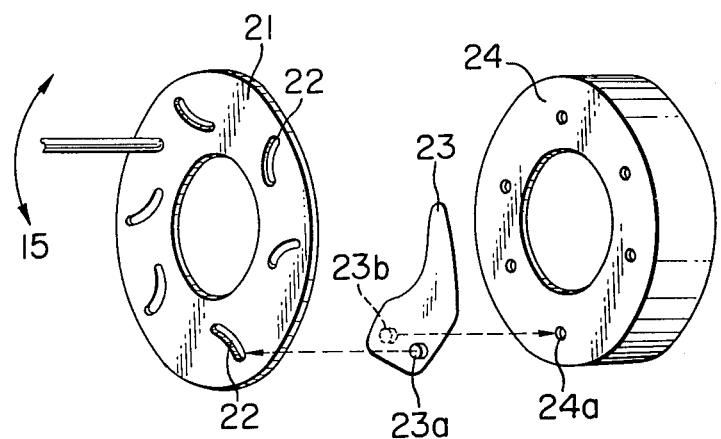
FIGS. 4, 5, and 6 illustrate embodiments which show the location whereat a correcting cam is installed.
Figure 5:
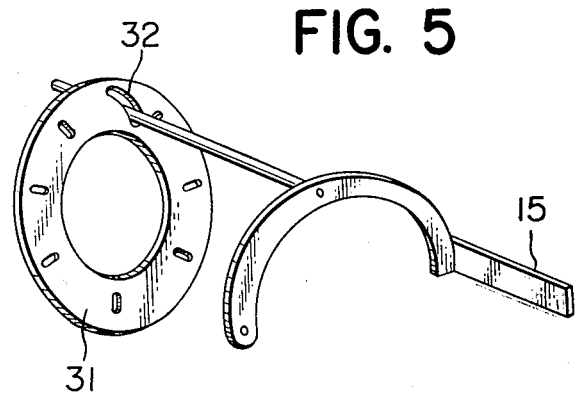
Figure 6:
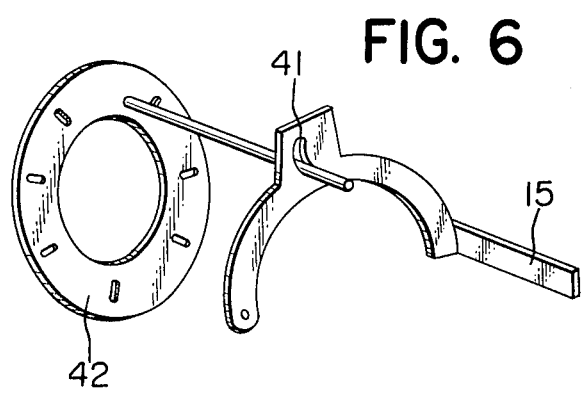

The number of stop down steps and the stroke characteristic of the diaphragm driving lever 15, as described above, may be obtained by providing a correcting cam in the drive transmission path leading from the diaphragm driving lever 15 to the diaphragm. FIGS. 4 to 6 illustrate embodiments showing the location whereat the correcting cam is installed. In FIG. 4, the correcting cam 22 is provided on a diaphragm driving ring 21 rotated by the diaphragm driving lever 15. A diaphragm blade 23 has a pin 23a provided on the surface thereof adjacent to the diaphragm driving ring 21 fitted in the correcting cam 22 and a pin 23b provided on the back surface thereof and fitted in a hole 24a formed in a fixed ring 24, and when the diaphragm driving ring 21 is rotated, the diaphragm blade 23 is controlled through the correcting cam 22 as shown by the characteristic curve $d$ of FIG. 3. The correcting cam 22 may be provided on the diaphragm balde 23 or the fixed ring 24.

In FIG. 5, the correcting cam 32 is provided on a diaphragm driving ring 31 and the rotation of the diaphragm driving ring 31 itself is controlled by the diaphragm driving lever 15, as shown by the aforesaid characteristic curve $d$. In FIG. 6, the correcting cam 41 is provided no the diaphragm driving lever 15 and a diaphragm driving ring 42 is rotated through the correcting cam 41, whereby control is effected as shown by the characteristic curve $d$. The shape of the correcting cam 22, 32 or 41 may be easily designed by those skilled in the art and need not be described in detail.

According to the present invention, as has hitherto been described, there is provided an objective lens in which aperture correcting means for imparting a correction of the stop down step number corresponding to the difference between the theoretical metering output calculated from the open F-value of the lens and the object brightness and the actual metering output, to the relationship between the displacement of the means for driving the diaphragm of the objective lens and the variation in area of the aperture opening, is provided on at least one of the diaphragm driving means and the diaphragm member. Therefore, if the objective lens provided with the correcting means is mounted on a single lens reflex camera of the TTL full aperture exposure measurement type, proper exposure may be obtained irrespective of the magnitude of the open F-value.

I believe that the construction and operation of my novel diaphragm connecting means of an objective lens mounted on a single lens reflex camera of the TTL full aperture exposure measurement type will now be understood and that the advantages thereof will be fully appreciated by those persons skilled in the art.

I claim:

1. In an objective lens removably mountable with respect to a single lens reflex camera housing, said lens having a diaphragm member forming an aperture, and diaphragm driving means displaceable to stop down said diaphragm member in a range over which the area of said aperture is from maximum to minimum, said housing having a metering circuit for measuring the light transmitted through said lens when said aperture is maximum, the improvement comprising:

diaphragm correcting means provided on at least one of said diaphragm driving means and said diaphragm member to impart a correction of the stop down step number corresponding to the difference between a theoretical metering output calculated from the open F-value of said lens and the brightness of an object and the actual metering output of said metering circuit.

2. The objective lens according to claim 1, wherein said camera has interlock means responsive, when said lens is mounted, to shutter release operation to displace the diaphragm driving means of said lens, and said diaphragm driving means includes a first member engaged with said interlock means, and a second member engaged with said first member and said diaphragm member.

3. The objective lens according to claim 2, wherein said diaphragm correcting means is a cam provided at the portion of engagement between said second member and said diaphragm member.

4. The objective lens according to claim 2, wherein said diaphragm correcting means is a cam provided at the portion of engagement between said first member and said second member.

5. In an objective lens removably mountable with respect to a single lens reflex camera housing, said lens having a diaphragm aperture control mechanism and said housing having a metering circuit for measuring the light transmitted through said lens when said diaphragm aperture is maximum, automatic exposure control means for calculating a proper diaphragm aperture based on output from the metering circuit and a member interlocking with the shutter release operation and a displaceable corresponding to output from said exposure control means, the improvement wherein:

said aperture control mechanism includes diaphragm means for defining the diaphragm aperture, means for driving the diaphragm means from said maximum aperture to said proper aperture, the amount of displacement of said driving means being defined by the amount of displacement of said interlocking member, and means for transmitting driving force from said driving means to said diaphragm means, said force transmitting means comprising means for correcting the amount of displacement of said diaphragm means in correspondence with the difference between a theoretical metering output calculated from the open F-value of the lens and the brightness of an object and the actual metering output of said metering circuit.

6. The structure according to claim 5, wherein the amount of correction by said correcting means is continuously increased from the maximum diaphragm aperture to a predetermined diaphragm aperture and is constant from the predetermined diaphragm aperture to the minimum aperture.

7. The structure according to claim 6, wherein said driving force transmitting means includes a ring formed with a plurality of slots;

said diaphragm means includes pins engaging the respective slots, said ring being rotatable in association with the displacement of said diaphragm driving means so that said diaphragm means varies said diaphragm aperture through said pins; and said correcting means is formed by a cam-shaped contour of each slot.

8. The structure according to claim 6, wherein said driving force transmitting means includes a ring formed with a plurality of slots; said diaphragm means includes pins engaging the respective slots; said ring being rotatable in association with the displacement of said diaphragm driving means so that said diaphragm means varies said diaphragm aperture through said pins; and said correcting means includes a cam disposed between said diaphragm driving meand and said ring.

* * * * *

UNITED STATES PATENT AND TRADEMARK OFFICE
CERTIFICATE OF CORRECTION

PATENT NO. : 4,266,865
DATED : May 12, 1981
INVENTOR(S) : TORU FUKUHARA

It is certified that error appears in the above—identified patent and that said Letters Patent is hereby corrected as shown below:

Column 2, line 37, "circuite" should be --circuit--; at line 56, "Fig. 2" should begin a new paragraph.

Column 3, line 34, delete "is stopped down by" after "$N_1$= 2; line 57, "The stroke" should begin a new paragraph.

Column 4, line 26, "balde" should be --blade--; line 33, "no" should be --on--.

Column 6, line 40, "meand" should be --means--.

Signed and Sealed this

Thirteenth Day of October 1981

[SEAL]

Attest:

Attesting Officer

GERALD J. MOSSINGHOFF

Commissioner of Patents and Trademarks